United States Patent
Goodrich et al.

(10) Patent No.: US 12,139,691 B2
(45) Date of Patent: *Nov. 12, 2024

(54) VEGETABLE OIL TREATMENT PROCESS

(71) Applicant: Green Lizard Technologies Ltd., Belfast (GB)

(72) Inventors: Peter Goodrich, Belfast (GB); Eoghain O'Hara, Belfast (GB); Martin Atkins, Belfast (GB)

(73) Assignee: Green Lizard Technologies Ltd., Belfast (GB)

( * ) Notice: Subject to any disclaimer, the term of this patent is extended or adjusted under 35 U.S.C. 154(b) by 622 days.

This patent is subject to a terminal disclaimer.

(21) Appl. No.: 17/289,449

(22) PCT Filed: Oct. 29, 2019

(86) PCT No.: PCT/GB2019/053050
§ 371 (c)(1),
(2) Date: Apr. 28, 2021

(87) PCT Pub. No.: WO2020/089602
PCT Pub. Date: May 7, 2020

(65) Prior Publication Data
US 2022/0010235 A1    Jan. 13, 2022

(30) Foreign Application Priority Data

Oct. 29, 2018 (GB) ...................... 1817663

(51) Int. Cl.
| | |
|---|---|
| *C11B 3/06* | (2006.01) |
| *A23D 9/04* | (2006.01) |
| *A23L 5/20* | (2016.01) |
| *B01D 17/02* | (2006.01) |

(52) U.S. Cl.
CPC ............. *C11B 3/06* (2013.01); *A23D 9/04* (2013.01); *A23L 5/27* (2016.08); *B01D 17/02* (2013.01); *A23V 2002/00* (2013.01)

(58) Field of Classification Search
CPC ....... C11B 3/06; B01D 17/02; B01D 17/0217; B01D 3/10
See application file for complete search history.

(56) References Cited

U.S. PATENT DOCUMENTS

| | | |
|---|---|---|
| 1,885,859 A | 11/1932 | Ludwig et al. |
| 6,579,996 B2 | 6/2003 | Peter et al. |
| 2002/0111504 A1 | 8/2002 | Peter et al. |

FOREIGN PATENT DOCUMENTS

| | | | | |
|---|---|---|---|---|
| GB | 391658 A | | 5/1933 | |
| GB | 2538756 A | * | 11/2016 | ............... C11B 3/06 |
| GB | 2538758 A | | 11/2016 | |
| WO | 2012169718 A1 | | 12/2012 | |
| WO | WO2012/169718 | * | 12/2012 | ............... A23D 9/02 |

OTHER PUBLICATIONS

Siegfried, P. et al., Deacidification of oils and fats of biological orgine by aqueous solutions of tertiary amines, Oleagineux, Corps. Gras, Lipides, vol. 8, No. 1, 53-6, pp. 1-9 (Year: 2001).*
European Journal of Lipid Science and Technology, 2009, vol. 111 (10), Oybek Zufarov et al., pp. 985-992, disclosing use of an organic amine(mono-, di-, tri-ethanolamine) for removing phosphorous compoundsfrom vegetable bils suitable for chloropropanol prevention.
International Search Report dated Jan. 17, 2020 for App.No. PCT/GB2019/053050.
UK Search Report for GB1817663.6 dated Apr. 30, 2019.
Siegfried Peter. Martin Drescher. Wolfgang Konig and Eckhard Weidner: "Deacidification of oils and fats of biological origine by aqueous solutions of tertiary amines", Oleagi Neux Corps Gras Lipides, vol. 8, Feb. 2001 (Feb. 2001), pp. 1-9, XP2796639, the whole document.

* cited by examiner

*Primary Examiner* — Yate' K Cutliff
(74) *Attorney, Agent, or Firm* — Ryan T. Grace; Advent, LLP

(57) ABSTRACT

The present invention is directed to a chloropropanol prevention pre-treatment process for crude vegetable oils.

17 Claims, No Drawings

VEGETABLE OIL TREATMENT PROCESS

The present invention is directed to a chloropropanol prevention pre-treatment process for crude vegetable oils.

There are a plethora of vegetable oils that may be extracted from natural sources for human or animal consumption, or for other domestic and commercial uses, including use in bio-diesel. Typically, it is necessary for vegetable oils to undergo refining before their use, which can vary depending on the particular oil and the associated level and nature of any contamination following extraction, and also depending, for instance, on the desired organoleptic properties of the refined oil.

Vegetable oils have numerous applications and are typically associated with use in bio-diesel applications, food preparation and food additives, and even as additive in cosmetics and cleaning products. For example, palm oil, soybean oil, rapeseed oil (canola oil) and corn oil are known to have both food and non-food applications.

In order to be rendered edible, crude vegetable oils must undergo a refining process to remove unwanted components. Crude palm oil comprises mono-, di- and tri-glycerides, carotenes, sterols, as well as free fatty acids (FFA), which are not esterified with glycerol to any extent. FFA leads to degradation of the oil and an increase in rancidity and is thus one of a number of components that the refining process seeks to remove. Other possible contaminants of vegetable oils, the removal of which has become critically important, are chloropropanol and/or glycidol, or their fatty acid esters.

Unbound chloropropanol, particularly 3-MCPD, has been identified in numerous soy based products including, for example, soy sauce, as well as acid-hydrolysed vegetable protein. Meanwhile, chloropropanols and glycidol in the form of their fatty acid esters have been found to accumulate in glyceride oil, particularly refined oil which has been exposed to high temperatures, for example as a result of the refining process. Upon consumption, fatty acid esters of chloropropanols and glycidol are hydrolysed by lipases in the gastrointestinal tract, releasing free chloropropanols and glycidol. Chloropropanols typically exist in the form of monochloropropandiols, 2-chloro-1,3-propanediol (2-MCPD) and 3-chloro-1,2-propanediol (3-MCPD), or the corresponding dichloropropanols derived therefrom, 2,3-dichloropropan-1-ol (2,3-DCP) and 1,3-dichloropropan-2-ol (1,3-DCP) respectively.

The most common chloropropanol associated with the consumption of refined edible glyceride oils is 3-MCPD, which has been found to exhibit genotoxic carcinogenic effects in in vitro testing. As a result, the Joint FAO/WHO Expert Committee on Food Additives (JECFA) established a provisional maximum tolerable daily intake (TDI) of 2 μg/Kg body weight for 3-MCPD in 2001, which was retained on review of new studies in 2006. Investigations into the potential carcinogenic effects of the other free chloropropanols have also been undertaken (Food Chem Toxicol, 2013, August; 58: pages 467 to 478).

Fatty acid esters of chloropropanols are thought to be produced from a mono- or di-glyceride via the formation of a cyclic acyloxonium ion followed by ring opening with a chloride ion (Destaillats, F.; Craft, B. D.; Sandoz, L.; Nagy, K.; *Food Addit. Contam.* 2012b, 29, 29-37), as illustrated below where $R_1$=H (monoglyceride) or C(O)R (diglyceride); 1=2-MCPD ester; and 2=3-MCPD ester).

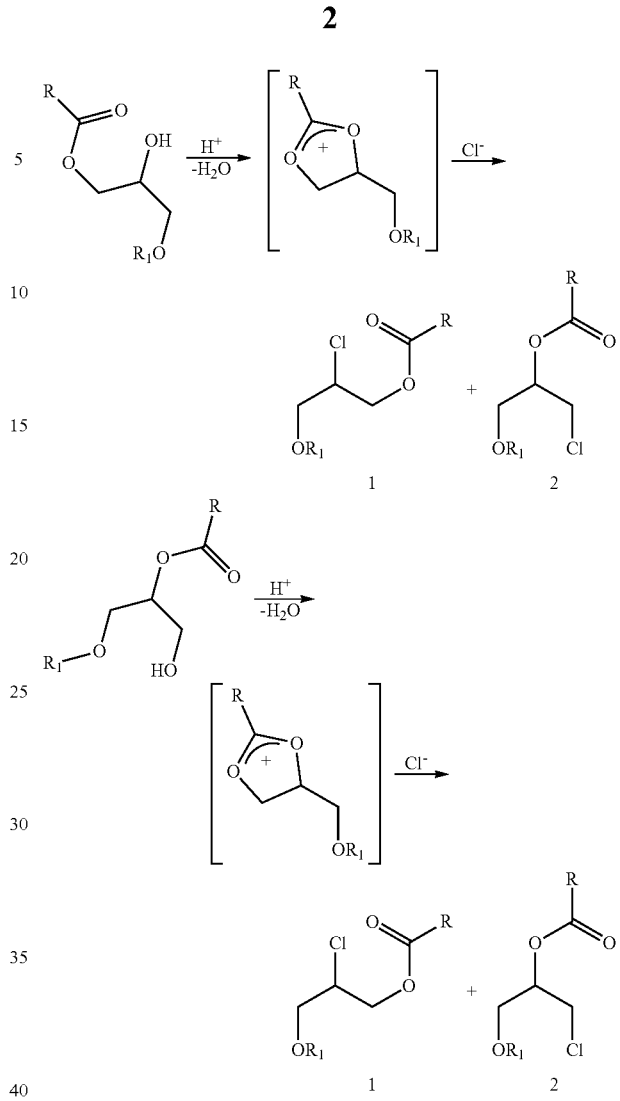

The International Life Sciences Institute (ILSI) Europe Report Series entitled "3-MCPD Esters in Food Products" by John Christian Larsen (October 2009) provides an overview of recent opinion with respect to 3-MCPD esters and their contamination in native, unrefined fats and oils, as well as refined fats and oils. Reported therein is an investigation conducted by Chemisches and Veterinaruntersuchungsamt (CVUA, Stuttgart, Germany), which indicated that traces of 3-MCPD esters can be found in some native, unrefined fats and oils. Meanwhile, significant amounts of 3-MCPD esters were found in nearly all refined fats and oils.

Deodorisation was identified as the crucial step in the refining process leading to formation of 3-MCPD esters. However, it was also found that there is some formation as a result of bleaching, for instance with bleaching earth. Furthermore, an acidic pre-treatment of crude oil, for instance with hydrochloric or phosphoric acids as part of degumming was also found to exacerbate 3-MCPD ester formation. The survey classified the refined vegetable oils and fats which were tested as part of the survey according to the level of 3-MCPD found to be ester-bound therein, shown below:

Low level (0.5-1.5 mg/kg): rapeseed, soybean, coconut, sunflower oil

Medium level (1.5-4 mg/kg): safflower, groundnut, corn, olive, cottonseed, rice bran oil High level (>4 mg/kg): hydrogenated fats, palm oil and palm oil fractions, solid frying fats.

It is also reported that fatty acid esters of glycidol have also been detected in refined glyceride oils. Glycidyl ester (GE) is another known contaminant which has been classified by the International Agency for Research on Cancer (IARC) as "probably carcinogenic to humans" (IARC Group 2A) and their formation, for instance during heat treatment of vegetable fat, has raised additional safety concerns (IARC, 2000). Glycidyl fatty acid esters are thought to derive from the same acyloxonium intermediate from which fatty acid esters of 3-MCPD and 2-MCPD are formed. Rather than nucleophilic attack of the acyloxonium with a chloride ion, the glycidyl ester is formed as a result of deprotonation and epoxide formation of an acyloxonium intermediate derived from a monoglyceride, as illustrated below.

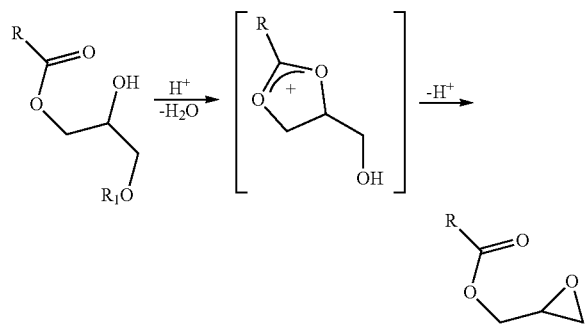

This is supported by the above ILSI report which states that, in the absence of sufficient amounts of chloride ions in the crude oil, the reaction ends with glycidyl fatty acid ester formation. In contrast, under the conditions of analysis conducted in the above CVUA investigation, involving addition of sodium chloride, it is reported that glycidol nearly quantitatively reacts to form 3-MCPD. There are strong indications that a significant amount (10 to 60%) of measured bound 3-MCPD does in fact derive from fatty acid esters of glycidol formed as a result of the analysis itself.

Glycidyl fatty acid ester is, however, believed to derive predominantly from diglyciderde as a result of a heat promoted intramolecular elimination reaction, as illustrated below (Destaillats, F.; Craft, B. D.; Dubois, M.; Nagy, *Food Chem.* 2012a, 131, 1391-1398).

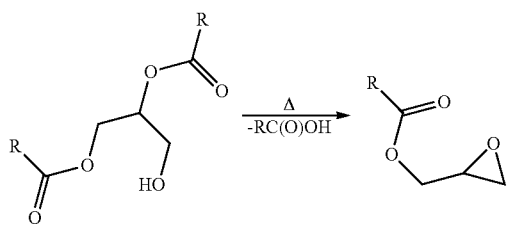

Water used as a strip stream for deodorisation was initially suspected of providing a source of chloride, thereby exacerbating the formation of chloropropanol fatty acid esters and glycidyl fatty acid esters. However, this was shown not to be the case (Prude) et al., Eur, J. Lipid Sci. Technol. 2011, 113, 368-373) and it has instead been suggested that the chlorine donor must instead be present in the oil in an oil-soluble form to enable the formation of chloropropanols (Matthaus et al., Eur, J. Lipid Sci. Technol. 2011, 113, 380-386).

Inorganic sources of chloride typically found in glyceride oils include iron [III] chloride (a coagulant in water treatment), KCl or ammonium chloride (used to improve plant growth), and calcium and magnesium chlorides. Meanwhile, organochlorine compounds present in crude glyceride oils can be converted to reactive chlorinated compounds such as hydrogen chloride, for instance as a result of thermal decomposition, which can react with acyl glycerols as illustrated above. The organochlorines may be endogenously produced by plants during maturation (Matthaus, B., *Eur. J. Lipid Sci. Technol.* 2012, 59, 1333-1334; Nagy, K.; Sandoz, L.; Craft, B. D.; Destaillats, F.; *Food Addit. Contam.* 2011, 28, 1492-1500; and "Processing Contaminants in Edible Oils-MCPD and Glycidyl Esters", *AOCS Press,* 2014, Chapter 1).

As mentioned above, the prevalence of fatty acid esters of chloropropanols and glycidol in glyceride oils increases substantially upon exposure to elevated temperatures and other process conditions associated with refining. Typically, phospholipid-containing glyceride oils such as crude palm oil undergo degumming with aqueous phosphoric acid and/or aqueous citric acid to remove hydratable and non-hydratable lipid components and other unwanted substances before FFA are removed. FFA are removed to improve organoleptic properties and oil stability. Deacidification in conventional processing is either by a chemical route (neutralisation) through the addition of a strong base such as sodium hydroxide ("chemical refining") or by means of a physical route such as steam stripping ("physical refining"). Edible oil refining also typically includes bleaching (e.g. with bleaching earth or clay) and deodorisation (which may also be used to remove FFA) before the refined glyceride oil is considered fit for commercial use. Several methods have now been proposed in the prior art for the removal of fatty acid esters of chloropropanols and glycidol, or their precursors, from edible glyceride oils as part of the overall refining process.

WO 2011/009843 describes a process for removing ester bound MCPD by stripping vegetable oil or fat with an inert gas, such as nitrogen, during deodorisation instead of steam stripping. The process is performed at temperatures of above 140° C. and below 270° C. and therefore offers no significant energy savings over conventional glyceride oil refining processes.

Eur, J. Lipid Sci. Technol. 2011, 113, 387-392 discloses a method of removal of 3-MCPD fatty acid esters and glycidyl fatty acid esters from palm oil using a calcined zeolite and synthetic magnesium silicate adsorbent. WO 2011/069028 also discloses a process for removing glycidyl fatty acid esters from vegetable oil by contacting with an adsorbent, such as magnesium silicate, silica gel and bleaching clay, before steam refining and deodorizing the oil. Issues with the use of adsorbents include the potential for neutral oil losses and the lack of adsorbent recycle options which can have a significant impact on the economic viability of preparing refined glyceride oil.

It is also known, for instance from U.S. Pat. No. 2,771,480, that ion exchange resins can be used for removing FFA, colour-bodies, gums and flavour materials from glyceride oils by adsorption of these impurities onto ion-exchange resins. WO 2011/009841 describes the use of an ion exchange resin, such as carboxymethyl cellulose, for selectively binding species involved in the formation of MCPD esters, or the esters themselves, during the deodorisation process.

As an alternative, WO 2012/130747 describes a process for removing chlorinated contaminants from crude plant oil by means of a liquid-liquid extraction with a polar solvent solution, for example an acidified ethanol-water solution, which is non-miscible with the plant oil. The polar solvent phase is discarded following the extraction before the oil undergoes further refinement.

Liquid-liquid extraction techniques with polar solvents have previously been disclosed as oil treatments for glyceride oils, for instance for the removal of FFA, operating on the basis of the solubility differences of the contaminant and the oil effecting separation by selective partitioning into a particular solvent phase. Meirelles et al., Recent Patents on Engineering 2007, 1, 95-102, gives an overview of such approaches to the deacidification of vegetable oils. Liquid-liquid extraction methods are generally considered to be advantageous on the basis that they may be performed at room temperature, they do not generate waste products and they benefit from low neutral oil losses. However, Meirelles et al. observe that there are significant capital costs associated with the implementation of a liquid-liquid extraction process and there remain doubts as to the overall benefits. Moreover, the polar solvents used in these liquid-liquid extraction techniques are often capable of also removing mono- and di-glycerides from the oil in addition to FFA, which may not be desirable.

It would be beneficial if there was a vegetable oil treatment which could reduce or eliminate chloropropanols in refined vegetable oils, and which could be readily integrated into conventional refining processes.

The present invention derives from the surprising discovery that by subjecting a crude oil to a pre-treatment with dimethylethanolamine (DMEA), formation of chloropropanols during refining may be reduced or even avoided, with no specific treatment of the refined oil needed to remove chloropropanols.

In one aspect, the present invention provides a chloropropanol prevention pre-treatment process for crude vegetable oils, the process comprising the steps of:
(i) contacting a crude vegetable oil with an aqueous DMEA solution such that the amount of DMEA relative to the crude vegetable oil is from 1 wt. % to 10 wt. %, to form a pre-treated vegetable oil and an aqueous phase; wherein the aqueous DMEA solution comprises water in an amount from 5 wt. % to 40 wt. % relative to the DMEA; and
(ii) separating the pre-treated vegetable oil from the aqueous phase before further treating the pre-treated vegetable oil.

Surprisingly, by treating a crude vegetable oil with DMEA prior to further treatment steps, it has been found that the formation of chloropropanols may efficiently be reduced or eliminated in the refined oil. This differs significantly from the conventional approach of extracting chloropropanols from vegetable oils after they have already formed. In this way, additional processing steps specifically for removing chloropropanols during or after conventional refining may be avoided.

Without wishing to be bound by any particular theory, it is believed that treatment of the crude oil with DMEA can remove components of the oil, for example chlorinated compounds, which typically lead to the formation of chloropropanols during refining. When such components are removed or reduced during pre-treatment, formation of chloropropanols at later stages may be reduced or eliminated, without the need for additional chloropropanol removal processes, which may be economically inefficient, may adversely affect oil quality or may interfere with other downstream refining processes.

Furthermore, by pre-treating a crude vegetable oil with DMEA according to the present invention, the requirements of subsequent refining steps may be reduced. For example, less harsh conditions may be used or the duration of some refining steps may be reduced, leading to a decrease in the amount of chloropropanols formed during the refining steps. In this way, even where some material that is able to form chloropropanols is still present in the oil during subsequent refining steps, the propensity for forming chloropropanols is reduced.

The term "crude" used herein in reference to glyceride oil is intended to mean glyceride oil which has not undergone refining steps following oil extraction. For example, crude glyceride oil will not have undergone degumming, deacidification, winterisation, bleaching, depigmentation or deodorization. "Refined" used herein in reference to glyceride oil is intended to mean a glyceride oil which has undergone one or more refining steps, such as degumming, deacidification, winterisation, bleaching, depigmentation and/or deodorization.

"DMEA" as referred to herein will be understood to mean dimethylethanolamine, which has the formula:

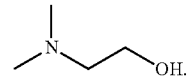

The use of DMEA in the pre-treatment of vegetable oils is advantageous since its use as an additive in or as a reagent in the processing of food products is approved in many countries. This is particularly advantageous in applications where it is intended to use the vegetable oil in food products, or as a cooking oil.

The present process is a pre-treatment process and is carried out on crude oil prior to conventional refining steps. For example, the present process may be carried out at the mill where the oil is extracted before transferring the oil to conventional refining processes. In this way, the present process may be easily integrated at the beginning of existing oil refining processes.

According to the invention, a crude vegetable oil is contacted with an aqueous DMEA solution such that the amount of DMEA relative to the crude vegetable oil is from 1 wt. % to 10 wt. %. Preferably, the aqueous DMEA solution is contacted with the crude vegetable oil such that the amount of DMEA relative to the crude vegetable oil from 2 wt. % to 8 wt. %, preferably from 4 wt. % to 6 wt. %, for example 5 wt. %.

The DMEA is in aqueous solution where the aqueous DMEA solution comprises water in an amount from 5 wt. % to 40 wt. % relative to the DMEA. In preferred embodiments, the aqueous DMEA solution comprises water in an amount from 15 wt. % to 40 wt. % relative to the DMEA, preferably from 25 wt. % to 35 wt. %, for example about 30 wt. %.

In some embodiments, the aqueous DMEA solution may comprise one or more other solvents in addition to water. Polar solvents are preferred additional solvents. For example, a mixture of water and alcohol may be used. Alternatively, in some preferred embodiments, the aqueous DMEA solution consists essentially of DMEA and water.

"Chloropropanol" referred to herein corresponds to chloropropanols which may, for instance, derive from glycerol and which include monochloropropanol: 2-chloro-1,3-propanediol (2-MCPD) and 3-chloro-1,2-propanediol (3-MCPD), as well as dichloropropanol: 2,3-dichloropropan-1-ol (2,3-DCP) and 1,3-dichloropropan-2-ol (1,3-DCP). Chloropropanols will also be understood to refer to fatty acid esters of chloropropanols, for example corresponding to the mono- or di-ester form of the chloropropanols formed from esterification with free fatty acids.

Once fatty acid esters of the chloropropanols are formed, their solubility is much closer to that of the oil than the unbound chloropropanol and extraction from oil using liquid-liquid extraction can be more difficult. By preventing the formation of chloropropanols according to the present pretreatment, this problem may be conveniently avoided.

Preferably, the chloropropanol comprises monochloropropanol or fatty acid esters thereof. In instances, the chloropropanol comprises 2-chloro-1,3-propanediol (2-MCPD), 3-chloro-1,2-propanediol (3-MCPD), or a combination thereof. More preferably, the chloropropanol comprises 3-chloro-1,2-propanediol (3-MCPD) or fatty acid esters thereof.

In some preferred embodiments, the chloropropanol is unbound monochloropropanol. Preferably the chloropropanol is unbound 3-MCPD.

The step of contacting the crude vegetable oil with the aqueous DMEA solution may be conducted at any suitable temperature. The present process has the advantage that in some embodiments it may be carried out without externally applied heating or cooling. However, in other embodiments heating may be applied in order to optimise the process.

The step of contacting the crude vegetable oil with the aqueous DMEA solution is suitably conducted at a temperature lower than the boiling point of DMEA. For example, the contacting step is typically carried out at a temperature of less than 130° C. Preferably, the contacting step is conducted at a temperature of less than 80° C. In preferred embodiments, the contacting step is conducted at a temperature of from 25 to 70° C., more preferably from 35 to 65° C., most preferably from 45 to 55° C., for example about 50° C.

As will be appreciated, where the vegetable oil is semisolid at room temperature, higher temperatures are preferable such that the vegetable oil is in a liquid form for contacting with the liquid organic amine. Suitably, the contacting step is carried out at a pressure of from 0.1 MPa absolute to 10 MPa absolute (1 bar absolute to 100 bar absolute).

The step of contacting the crude vegetable oil with the aqueous DMEA solution may be carried out by any suitable method using any suitable apparatus. It will be appreciated that methods and apparatus for mixing liquids are well-known to the person of skill in the art.

By way of example, the contacting step may be carried out by stirring the crude vegetable oil with the aqueous DMEA solution for a period of time. It will be appreciated that the period of time may depend on the nature of the crude vegetable oil being treated and the precise conditions applied. Typically, the stirring is carried out for a time period of from 1 minute to one hour, and preferably from 5 minute to 30 minutes. In some embodiments, the contacting is carried out using an ultrasonic stirrer, an electromagnetic stirrer, or by bubbling inert gas through the mixture.

In preferred embodiments, the step of contacting the crude vegetable oil with the aqueous DMEA solution comprises mixing using a mixer such as a shear mixer. Preferably, the mixture of the crude vegetable oil with the aqueous DMEA solution is stirred at a speed of from 500 to 5000 rpm, preferably 3500 to 4500 rpm, for example about 4000 ppm.

Suitably, after the step of contacting the vegetable oil with the DMEA solution, the mixture may be left so that an oil phase separates from an aqueous phase. The oil phase comprises a pre-treated glyceride oil with a reduced propensity for the formation of chloropropanols during refining. Typically, the mixture is left for several hours to allow the two phases to separate and preferably the mixture is left overnight.

Any suitable means of separating the pre-treated oil phase and the aqueous phase may be used. For example, gravity separation (for example, in a settling unit) may be carried out. In this process, the pre-treated oil is generally the upper phase and the aqueous phase forms the lower phase. Separation may also be achieved using for example, a decanter, a hydrocyclone, electrostatic coalesce, a centrifuge or a membrane filter press. Contacting and separation steps may be repeated several times, for example 2 to 4 times. Preferably, separation is carried out via centrifugation.

Contacting and separation steps may also be carried out together in a counter-current reaction column. The crude vegetable oil stream is generally introduced at or near the bottom of the counter-current reaction column and the DMEA solution stream at or near the top of the counter-current reaction column. A pre-treated oil stream is withdrawn from the top of the column and an aqueous phase from at or near the bottom thereof. Preferably, the counter-current reaction column has a sump region for collecting the aqueous phase. Preferably, the crude vegetable oil stream is introduced to the counter-current reaction column immediately above the sump region. More than one counter-current reaction column may be employed, for example 2 to 6, preferably 2 to 3 columns arranged in series. Preferably, the counter-current reaction column is packed with a structured packing material, for example, glass Raschig rings, thereby increasing the flow path for the oil and aqueous DMEA solution through the column. Alternatively, the counter-current reaction column may contain a plurality of trays.

In some instances, contacting and separating steps are carried out together in a centrifugal contact separator, for example, a centrifugal contact separator as described in U.S. Pat. Nos. 4,959,158, 5,571,070, 5,591,340, 5,762,800, WO 99/12650, and WO 00/29120. Suitable centrifugal contact separators include those supplied by Costner Industries Nevada, Inc. Vegetable oil and the DMEA solution may be introduced into an annular mixing zone of the centrifugal contact separator. Preferably, the vegetable oil and the DMEA solution are introduced as separate feed streams into the annular mixing zone. The vegetable oil and the DMEA solution are rapidly mixed in the annular mixing zone. The resulting mixture is then passed to a separation zone wherein a centrifugal force is applied to the mixture to produce a clean separation of an oil phase and an aqueous phase.

Preferably, a plurality of centrifugal contact separators are used in series, preferably, 2 to 6, for example 2 to 3. Preferably, the vegetable oil feed stream is introduced into the first centrifugal contact separator in the series while the DMEA feed stream is introduced into the last centrifugal contact separator in the series. Thus, an aqueous phase is removed from the first centrifugal contact separator and the pre-treated oil phase is removed from the last centrifugal contact separator in the series.

The pre-treated vegetable oil may also be passed through a coalescer filter for coalescing fine droplets of non-oil phase liquid, so as to produce a continuous phase and facilitate phase separation. Preferably, the coalescer filter is wetted to improve filtration.

After the DMEA solution and vegetable oil have been contacted and separated, a pre-treated glyceride oil is separated from an aqueous phase. The pre-treated vegetable oil has a reduced propensity for forming chloropropanols during subsequent refining.

It will be appreciated that excess DMEA is typically removed as part of the aqueous phase. Where residual DMEA remains in the pre-treated oil, this may be removed from the oil or, in some embodiments, for example where low enough amounts of DMEA remain, may not be removed from the oil. It will be appreciated that the need to remove residual DMEA may depend on the intended use of the oil.

Preferably, the process further comprises the step of removing residual DMEA from the pre-treated vegetable oil.

The residual DMEA may be removed from the pre-treated oil by any suitable method. For example, the pre-treated oil may be washed with water so as to reduce the concentration of any residual organic amine present in the treated glyceride oil. The pre-treated oil may then be dried to further reduce the concentration of residual DMEA present in the pre-treated oil. For example, residual DMEA may be removed from the pre-treated oil by vacuum drying. Alternatively, other suitable methods for removing residual DMEA may be used.

Residual DMEA may, in some instances be removed during further treatment steps of the pre-treated oil. In some preferred embodiments, residual DMEA is removed at least in part during a bleaching step.

In preferred embodiments, residual DMEA is removed from the pre-treated oil at least in part by vacuum distillation. Preferably the vacuum distillation is conducted at a temperature of from 25 to 70° C., more preferably from 35 to 65° C., most preferably from 45 to 55° C., for example about 50° C.

The term "vegetable oil" used herein includes all plant, nut and seed oils, which usually comprise triglycerides as the major component thereof. For example, the triglyceride component may be at least 50 wt. % of the vegetable oil. The vegetable oil may typically also include mono- and/or di-glycerides. Preferably, the vegetable oil is edible. Vegetable oils typically also include phospholipid components in their crude form. Typically, the crude vegetable oil comprises a vegetable oil that is liquid at room temperature. However, the vegetable oil may comprise a vegetable oil that is solid at room temperature. In this scenario, the contacting of the vegetable oil with the DMEA solution may be done at a temperature above room temperature and above the melting point of the vegetable oil.

Examples of suitable vegetable oils which may be of use in the present invention include: açai oil, almond oil, beech oil, cashew oil, coconut oil, colza oil, corn oil, cottonseed oil, grapefruit seed oil, grape seed oil, groundnut oil, hazelnut oil, hemp oil, lemon oil, macadamia oil, mustard oil, olive oil, orange oil, palm oil, palm kernel oil, peanut oil, pecan oil, pine nut oil, pistachio oil, poppyseed oil, rapeseed oil, rice bran oil, safflower oil, sesame oil, soybean oil, sunflower oil, walnut oil and wheat germ oil.

Preferred vegetable oils include coconut oil, corn oil, cottonseed oil, groundnut oil, olive oil, palm oil, rapeseed oil, rice bran oil, safflower oil, soybean oil, sunflower oil, or mixtures thereof.

Preferably, the vegetable oil is palm oil or soybean oil.

The term "soybean oil" used herein includes oil extracted from the seeds of the soybean (*Glycine max*). The term "rapeseed oil" used herein is synonymous with canola oil and refers to the oil derived from a species of rape plant, for example rapeseed (*Brassica napus* L.) or field mustard/turnip rape (*Brassica rapa* subsp. *oleifera*, syn. *B. campestris* L.). The term "palm oil" used herein includes an oil at least partially derived from a tree of genus *Elaeis*, forming part of the Arecaceae genera, and including the species *Elaeis guineensis* (African oil palm) and *Elaeis oleifera* (American oil palm), or hybrids thereof. Reference to palm oil herein therefore also includes palm kernel oil.

Vegetable oils often comprise free fatty acid (FFA) molecules. FFA which may be present in the vegetable oils include monounsaturated, polyunsaturated and saturated FFA. Examples of unsaturated FFA include: myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid and docosahexaenoic acid. Examples of saturated FFA include: caprylic acid, capric acid, undecylic acid, lauric acid, tridecylic acid, myristic acid, palmitic acid, margaric acid, stearic acid, nonadecylic acid, arachidic acid, heneicosylic acid, behenic acid, lignoceric acid and cerotic acid.

Typically, free fatty acids are present in the crude vegetable oil in an amount of from 1 wt. % to 50 wt. %, preferably 1 wt. % to 30 wt. %, more preferably 1 wt. % to 25 wt. %, and most preferably 1 wt. % to 20 wt. %, for example from 1 wt. % to 10 wt. %.

According to the present process, the pre-treated vegetable oil is separated from the aqueous phase before further treating the pre-treated vegetable oil.

In some preferred embodiments, the process further comprises the step of further treating the pre-treated vegetable oil. Further treatment is typically done as part of a conventional vegetable oil refining process.

The skilled person is aware of the different refining steps typically used in edible oil processing, including for example refining steps discussed in: "Practical Guide to Vegetable Oil Processing", 2008, Monoj K. Gupta, AOCS Press, as well as in the Edible Oil Processing section of the "AOCS Lipid Library" website (lipidlibrary.aocs.org).

Further treatment may comprise one or more of degumming, deacidification, winterisation, bleaching, depigmentation or deodorization.

In preferred embodiments, the further treatment comprises deodorization, and preferably also comprises bleaching.

In some embodiments, the further treatment comprises the steps of degumming, bleaching and deodorization. Alternatively, in other embodiments, the further treatment comprises a deodorisation step and the process does not comprise a step of degumming and/or bleaching. Therefore, in exemplary embodiments, the at least one further treating step comprises the steps of degumming and deodorization, but no bleaching. In other exemplary embodiments, the at least one further refining step comprises the steps of bleaching and deodorization, but no degumming step.

An additional advantage of the treatment with DMEA in accordance with the present invention is that the treatment has also been found to at least partially remove pigments and odiferous compounds which are typically removed in a high temperature (for example, 240° C. to 270° C.) deodorization step during conventional refining processes. Treatment of vegetable oil with DMEA means that lower temperatures and/or time periods can be used for the deodorization step as part of the overall refining process. This has the advantage of reducing the energy requirements of the refining process.

As the skilled person is aware, deodorization corresponds to a stripping process in which an amount of stripping agent is passed through an oil in a distillation apparatus, typically by means of direct injection, at reduced pressure for a period of time so as to vaporize and extract volatile components, such as FFA, aldehydes, ketones, alcohols, hydrocarbons, tocopherols, sterols, and phytosterols. The stripping agent is preferably steam, although other agents such as nitrogen may be used. The amount of stripping agent suitably used is from about 0.5% to about 5% by weight of oil.

The temperature range of deodorization is suitably from 160° C. to 270° C. Where reference is made herein to the temperature of the deodorization step, this refers to the temperature the oil is heated to before being exposed to the stripping agent. The pressure range of deodorization is suitably from 0.1 to 0.4 kPa (1 to 4 mbar), preferably 0.2-0.3 kPa (2 to 3 mbar). Suitable time periods for deodorization are typically from 30 to 180 minutes, for example 60 to 120 minutes, or 60 to 90 minutes.

The skilled person is able to determine a suitable length of deodorization by analysing the appearance and composition of the vegetable oil. For instance, determining the p-anisidine value (AnV) of the oil. The p-anisidine value of an oil is a measure of its oxidative state and, more specifically, provides information regarding the level of secondary oxidation products contained in an oil, although primarily aldehydes such as 2-alkenals and 2,4-dienals. The p-anisidine value (AnV) therefore also gives an indication of the level of oxidation products which are intended to be removed by means of the deodorization step. For instance, satisfactory deodorization may be achieved where, for example, the AnV is less than 10, preferably less than 5, as determined by AOCS Official Method Cd 18-90.

In addition or alternatively, the amount of aldehyde and ketone components of the oil can be determined, which are typically associated with a crude oil's odour, to determine whether sufficient deodorization has taken place. Typical volatile odiferous aldehyde and ketone components of crude or rancid palm oil include: acetaldehyde, benzaldehyde, n-propanal, n-butanal, n-pentanal, n-hexanal, n-octanal, n-nonanal, 2-butenal, 3-methylbutanal, 2-methylbutanal, 2-pentenal, 2-hexenal, 2E,4E-decadienal, 2E,4Z-decadienal, 2-butanone, 2-pentanone, 4-methyl-2-pentanone, 2-heptanone, 2-nonanone. Preferably, each of these components is individually present in a deodorized oil in an amount less than 3 mg/kg of oil, more preferably less than 1 mg/kg of oil, most preferably less than 0.5 mg/kg of oil.

The amount of aldehydes and ketones may be readily determined by chromatographic methods, for instance GC-TOFMS or GCxGC-TOFMS. Alternatively, derivatization of aldehydes and ketones may be used to improve chromatographic analysis. For example, it is known that aldehydes and ketones may be derivatized with 2,4-dinitrophenylhydrazine (DNPH) under acidic conditions. This reagent does not react with carboxylic acids or esters and therefore the analysis is not affected by the presence of such components in a glyceride oil sample. Following derivatization, HPLC-UV analysis can quantify the total amount of aldehydes and ketones which are present in a sample.

Conventional deodorisation temperatures are typically in excess of 220° C., for example 240° C. to 270° C., and typically operated for 60 to 90 minutes. Where lower than conventional temperatures are used for deodorisation as may be allowed by the process of the present invention, for example 160° C. to 200° C., the time periods for deodorization may be lengthened to ensure sufficient deodorization, yet still involve less energy consumption than a conventional deodorization operated at higher temperature, for example 240° C. to 270° C., for a shorter period.

In preferred embodiments, the same or lower than conventional deodorization time periods are used in combination with the lower than conventional deodorization temperature, yet achieve the same extent of deodorization as a result of the DMEA pre-treatment. In other preferred embodiments, where conventional temperatures are used for the deodorization step, for example 240° C. to 270° C., the time period for the deodorization may be reduced compared to that which is conventionally used and still achieve a comparable level of deodorization as a result of the DMEA pre-treatment.

In particularly preferred embodiments, where the further treatment comprises deodorisation, the temperature of the deodorization is from 160° C. to 200° C., more preferably 170° C. to 190° C. Preferably, the time period over which deodorization is conducted at these temperatures is from 30 to 150 minutes, more preferably 45 to 120 minutes, most preferably 60 to 90 minutes.

As discussed herein, conventional vegetable oil refining processes include a high temperature (for example 240 to 270° C.) deodorization step which can contribute substantially to the formation of chloropropanol fatty acid esters. By pre-treating the vegetable oil in accordance with the present invention, the temperature and/or duration of the deodorisation may be reduced in comparison to conventional processes, leading to a reduction in the formation of chloropropanol fatty acid esters if precursors are present in the oil.

Degumming typically involves contacting the oil with aqueous phosphoric acid and/or aqueous citric acid to remove both hydratable and non-hydratable phosphatides (NHP). Typically, citric acid or phosphoric acid is added as a 50 wt. % aqueous solution. Suitably, the aqueous acid is used in an amount of about 0.02% to about 0.20% of acid by weight of oil, preferably 0.05% to about 0.10% of acid by weight of oil. Suitably, the degumming step is carried out at a temperature of from about 50 to 110° C., preferably 80° C. to 100° C., for example 90° C. The degumming step may suitably last from 5 minutes to 60 minutes, preferably 15 to 45 minutes, more preferably, 20 to 40 minutes, for example 30 minutes. After settling of the mucilage following the acid treatment, the aqueous phase is separated before the degummed oil is typically dried. Drying of the degummed oil suitably takes place at a temperature of from 80 to 110° C. for a suitable time period, for example 20 to 40 min, at reduced pressure, for instance, at 2 to 3 kPa (20 to 30 mbar).

As the skilled person is aware, for vegetable oils with low phosphatide content (for example, less than 20 ppm by weight of phosphorus), a dry degumming process may be used in which the phosphoric acid or citric acid is added without significant dilution with water (for example, an 85% acid solution). NHP are converted into phosphatidic acid and a calcium or magnesium bi-phosphate salt which can be removed from the oil in a subsequent bleaching step. For oils rich in phosphatides, particularly NHP, dry degumming is known to be less well suited since excessive amounts of bleaching earth are required.

It has been surprisingly found that the pre-treatment described herein is able to remove phosphorous-containing compounds from the crude vegetable oil. Thus, an advantage associated with pre-treatment using an aqueous DMEA solution according to the present invention is that the degumming requirement of the glyceride oil is reduced or eliminated.

Phosphorus-containing compounds such as phosphatides are partly responsible for formation of gums in glyceride oils and they are conventionally removed in conventional degumming processes. Phosphorus containing compounds that may be present in vegetable oils and that may have their concentration in the oil reduced by pre-treatment according to the invention include, but are not limited to phospholipids, phosphatides, or any combination thereof.

Since pre-treatment according to the invention can reduce the concentration of phosphorus and phosphor-containing compounds in the pre-treated vegetable oil, the requirement to degum the pre-treated vegetable oil may be eliminated or reduced. In instances where a degumming process is performed on the oil after the pre-treatment in accordance with use according to the invention, less acid may be required in the degumming step since many phosphorus-containing compounds will have been removed.

As discussed herein, acidic treatment of crude oil, for instance with hydrochloric or phosphoric acids as part of degumming, can exacerbate 3-MCPD ester formation. Thus, by pre-treating crude vegetable oil according to the present invention, degumming steps with acid may be eliminated or reduced, leading to less formation of 3-MCPD esters in the refined oil.

Bleaching is incorporated into an edible oil refining process to reduce colour bodies, including chlorophyll, residual soap and gums, trace metals and oxidation products. Bleaching typically involves contacting the oil with an amount of bleaching clay or earth, for example from 0.5 to 5 wt. % clay based on the mass of the oil. Bleaching clays or earths are typically composed of one or more of three types of clay minerals: calcium montmorillonite, attapulgite, and sepiolite. Any suitable bleaching clay or earth may be used in accordance with the present invention, including neutral and acid activated clays (e.g. bentonite). The oil is suitably contacted with bleaching clay for 15 to 45 minutes, preferably 20 to 40 minutes before the earth is separated, typically by filtration. The oil is typically contacted with bleaching clay or earth at a temperature of from 80° C. to 125° C., preferably at a temperature of from 90° C. to 110° C. Following an initial period of contact ("wet bleaching") conducted under atmospheric pressure, a second stage of the bleaching process is conducted under reduced pressure ("dry bleaching"), for example at 2 to 3 kPa (20 to 30 mbar).

Conventional vegetable oil refining processes typically include a FFA neutralisation step with a strong base, for example sodium hydroxide or potassium hydroxide (corresponding to a so called "chemical refining" process). Alternatively, deacidification can be achieved by adjusting the deodorisation parameters accordingly to ensure that volatile FFA is removed in that step (a so called "physical refining" process). A disadvantage of a FFA neutralisation step ("chemical refining") is that it is accompanied by unwanted saponification, lowering triglyeride content, whilst soap formation can lead to substantial neutral oil losses as a result of emulsification.

Preferably, the vegetable oil that has undergone further treatment has a total concentration of chloropropanol and fatty acid esters thereof of less than 2 ppm, preferably less than 1 ppm, as determined by DGF standard method C-VI 18 (10) A or B.

In preferred embodiments, the process further comprises the step of regenerating DMEA from the aqueous phase. Preferably DMEA is regenerated from the aqueous phase by vacuum distillation. In this way, the DMEA may be conveniently recycled and used again as part of the aqueous DMEA solution in a process as described herein.

The DMEA pre-treatment in accordance with the present invention can obviate the use of ion exchange resins and ultrafiltration membranes and the like for removing contaminants which can contribute significantly to the materials costs associated with vegetable oil refining. Thus, in preferred embodiments, the further treatment of the pre-treated oil does not comprise treatment of the pre-treated oil with ion exchange resins or ultrafiltration membranes.

According to a further aspect of the invention, there is provided use of DMEA for preventing the formation of chloropropanol, or fatty acid esters of chloropropanol, in crude vegetable oil by contacting the crude vegetable oil with the DMEA.

Use according to this aspect may be substantially as described previously herein in relation to the process of the present invention. In particular, the process steps, the vegetable oil and/or the chloropropanol may be substantially as described previously herein.

The invention claimed is:

1. A chloropropanol prevention pre-treatment process for crude vegetable oils, the process comprising the steps of:
   (i) contacting a crude vegetable oil with an aqueous dimethylethanolamine (DMEA) solution such that the amount of DMEA relative to the crude vegetable oil is from 1 wt. % to 10 wt. %, to form a pre-treated vegetable oil and an aqueous phase; wherein the aqueous DMEA solution comprises water in an amount from 5 wt. % to 40 wt. % relative to the DMEA; and
   (ii) separating the pre-treated vegetable oil from the aqueous phase before further treating the pre-treated vegetable oil.

2. The process according to claim 1, wherein the aqueous DMEA solution is contacted with the crude vegetable oil such that the amount of DMEA relative to the crude vegetable oil from 2 wt. % to 8 wt. %.

3. The process according to claim 1, wherein the aqueous DMEA solution comprises water in an amount from 15 wt. % to 40 wt. % relative to the DMEA.

4. The process according to claim 1, wherein the step of contacting the crude vegetable oil with the aqueous DMEA solution is conducted at a temperature of less than 80° C.

5. The process according to claim 1, wherein the step of contacting the crude vegetable oil with the aqueous DMEA solution comprises mixing with a shear mixer.

6. The process according to claim 1, further comprising the step of removing residual DMEA from the pre-treated vegetable oil.

7. The process according to claim 6, wherein residual DMEA is removed at least in part during a bleaching step.

8. The process according to claim 6, wherein residual DMEA is removed at least in part by vacuum distillation.

9. The process according to claim 8, wherein the vacuum distillation is conducted at a temperature of from 25 to 70° C.

10. The process according to claim 1, wherein the vegetable oil is selected from coconut oil, corn oil, cottonseed oil, groundnut oil, olive oil, palm oil, rapeseed oil, rice bran oil, safflower oil, soybean oil and sunflower oil, or mixtures thereof.

11. The process according to claim 1, wherein the chloropropanol is monochloropropanol, or fatty acid esters thereof.

12. The process according to claim 1, wherein the chloropropanol is unbound monochloropropanol.

13. The process according to claim 1, further comprising the step of further treating the pre-treated vegetable oil.

14. The process according to claim 13, wherein further treating the pre-treated vegetable oil comprises one or more steps selected from degumming, deacidification, bleaching, winterization, depigmentation and deodorization.

15. The process according to claim 13, wherein the further treating the pre-treated vegetable oil comprises deodorization and bleaching.

16. The process according to claim 13, wherein the vegetable oil that has undergone further treatment has a total concentration of chloropropanol and fatty acid esters thereof of less than 2 ppm as determined by DGF standard method C-VI 18 (10) A or B.

17. The process according to claim 1, further comprising the step of regenerating DMEA from the aqueous phase.

* * * * *